(12) United States Patent
Luedeke et al.

(10) Patent No.: US 9,733,952 B2
(45) Date of Patent: Aug. 15, 2017

(54) MICROPROCESSOR, AND METHOD OF MANAGING RESET EVENTS THEREFOR

(75) Inventors: Thomas Luedeke, Oberbergkirchen (DE); Markus Baumeister, Munich (DE); Carl Culshaw, Wigan (GB)

(73) Assignee: NXP USA, Inc., Austin, TX (US)

( * ) Notice: Subject to any disclaimer, the term of this patent is extended or adjusted under 35 U.S.C. 154(b) by 126 days.

(21) Appl. No.: 14/353,999

(22) PCT Filed: Feb. 27, 2012

(86) PCT No.: PCT/IB2012/050901
§ 371 (c)(1),
(2), (4) Date: Apr. 24, 2014

(87) PCT Pub. No.: WO2013/076591
PCT Pub. Date: May 30, 2013

(65) Prior Publication Data
US 2014/0317395 A1    Oct. 23, 2014

(30) Foreign Application Priority Data

Nov. 23, 2011    (WO) .................. PCT/IB2011/055259

(51) Int. Cl.
G06F 1/24       (2006.01)
G06F 9/44       (2006.01)
G06F 9/445      (2006.01)
G06F 11/07      (2006.01)

(52) U.S. Cl.
CPC ............... *G06F 9/442* (2013.01); *G06F 1/24* (2013.01); *G06F 9/44505* (2013.01); *G06F 11/076* (2013.01); *G06F 11/0721* (2013.01)

(58) Field of Classification Search
CPC ........................................................ G06F 1/24
See application file for complete search history.

(56) References Cited

U.S. PATENT DOCUMENTS

| | | | | |
|---|---|---|---|---|
| 5,159,217 A | * | 10/1992 | Mortensen | H03K 17/22 327/143 |
| 5,442,310 A | * | 8/1995 | Bazes | H03K 17/22 327/143 |
| 5,454,114 A | * | 9/1995 | Yach | G06F 1/24 700/1 |
| 5,528,749 A | | 6/1996 | Landis et al. | |
| 5,638,510 A | | 6/1997 | Ishikawa | |

(Continued)

FOREIGN PATENT DOCUMENTS

WO    WO2013076530 A1    5/2013

OTHER PUBLICATIONS

International Search Report and Written Opinion correlating to PCT/IB2012/050901 dated Oct. 16, 2012.

(Continued)

*Primary Examiner* — Jaweed A Abbaszadeh
*Assistant Examiner* — Gary Collins

(57) ABSTRACT

A microprocessor comprises at least one reset management module. The at least one reset management module is arranged to detect a reset event, determine if at least one reset condition has been met upon detection of the reset event, and cause at least a part of the microprocessor to remain in a reset state upon determining that the at least one reset condition has been met.

20 Claims, 4 Drawing Sheets

(56) References Cited

U.S. PATENT DOCUMENTS

| | | | | |
|---|---|---|---|---|
| 5,717,907 | A * | 2/1998 | Kuddes | G06F 1/24 713/340 |
| 5,860,125 | A * | 1/1999 | Reents | G06F 1/24 365/227 |
| 6,188,256 | B1 * | 2/2001 | Birns | G06F 1/24 327/142 |
| 6,393,590 | B1 | 5/2002 | Wood et al. | |
| 6,453,430 | B1 | 9/2002 | Singh et al. | |
| 6,463,529 | B1 | 10/2002 | Miller et al. | |
| 6,557,108 | B1 * | 4/2003 | Moore | G06F 1/24 709/200 |
| 8,473,717 | B2 * | 6/2013 | Hugosson | G06F 12/08 712/34 |
| 2002/0184574 | A1 | 12/2002 | Mackey et al. | |
| 2003/0037172 | A1 | 2/2003 | Lacombe et al. | |
| 2004/0095116 | A1 * | 5/2004 | Kernahan | G06F 1/24 323/282 |
| 2004/0225831 | A1 | 11/2004 | Pail et al. | |
| 2005/0105348 | A1 * | 5/2005 | Tanaka | G06F 1/24 365/200 |
| 2005/0210179 | A1 * | 9/2005 | Walmsley | B41J 2/04505 711/3 |
| 2005/0273585 | A1 * | 12/2005 | Leech | G06F 1/24 713/1 |
| 2007/0276939 | A1 | 11/2007 | Funato et al. | |
| 2008/0155359 | A1 | 6/2008 | Ginggen et al. | |
| 2008/0256374 | A1 | 10/2008 | Harris et al. | |
| 2009/0037770 | A1 | 2/2009 | Troppmann et al. | |
| 2009/0044050 | A1 | 2/2009 | Maimone et al. | |
| 2009/0300312 | A1 | 12/2009 | Handschuh et al. | |
| 2010/0199121 | A1 | 8/2010 | Abts et al. | |
| 2010/0306518 | A1 | 12/2010 | Suryawanshi | |
| 2011/0022878 | A1 | 1/2011 | Richards et al. | |
| 2011/0179255 | A1 * | 7/2011 | Pathirane | G06F 1/24 712/207 |
| 2011/0214006 | A1 | 9/2011 | Meek et al. | |
| 2014/0223233 | A1 * | 8/2014 | Heyrman | G06F 11/1402 714/23 |

OTHER PUBLICATIONS

International Search Report and Written Opinion correlating to PCT/IB2011/055259 dated Jun. 29, 2012.
Non-Final Office Action dated Dec. 11, 2015 for U.S. Appl. No. 14/354,005, 10 pages.
U.S. Appl. No. 14/354,005, Culshaw, C., "Microprocessor Device, and Method of Managing Reset Events Therefor", Notice of Allowance dated May 16, 2016.
Notice of Allowance dated May 16, 2016 for U.S. Appl. No. 14/354,005, 5 pages.

* cited by examiner

US 9,733,952 B2

MICROPROCESSOR, AND METHOD OF MANAGING RESET EVENTS THEREFOR

FIELD OF THE INVENTION

This invention relates to a microprocessor and a method of managing reset events therefor.

BACKGROUND OF THE INVENTION

In typical microcontroller devices, reset schemes are implemented whereby the microcontroller device will be reset upon a particular event occurring. In more intelligent systems, such a reset scheme may be divided into separate levels of reset, such as a destructive reset level and one or more functional reset levels. In a functional reset case only certain elements of the microcontroller device are reset, whilst in a destructive reset case a complete reset of the entire microcontroller device is performed. Accordingly, such a functional reset may typically be applied in response to non-critical reset events, whilst a destructive reset may be applied in response to a critical reset event. The limitation with conventional implementations is that reset events will always initiate a reset sequence ending in the device coming out of reset, even if the root cause of the reset has not been corrected by the reset sequence. However, in some cases it may be preferred to keep the device in a reset state in order to prevent reset cycling, in particular following a destructive reset.

For example, some non-critical events, such as a recurring system software watchdog timeout, may be handled as a destructive reset. If the root cause of the reset is not corrected by the reset sequence, this can lead to what is known as reset cycling (i.e. the device goes through a reset sequence, and the same or related reset event occurs again, thereby causing a new reset sequence to start). If such cycling continues it can lead to the situation where the error indicating event causing the reset spuriously does not occur, and the device starts to run in an inherently unsafe state since the root cause of the error will still be present. Furthermore, such reset cycling can also lead to increased power consumption.

SUMMARY OF THE INVENTION

The present invention provides a microprocessor device and a method of managing reset events within a microprocessor device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

The present invention will now be described with reference to a microprocessor device comprising one or more processing cores. For clarity, the term 'microprocessor device' used herein is intended to incorporate programmable processing devices intended for use within general purpose applications, such as personal computers as well as programmable processing devices intended for use within embedded applications, such as microcontroller devices and system on chip devices, and specialised programmable processing devices such as digital signal processor devices. Because the illustrated examples may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
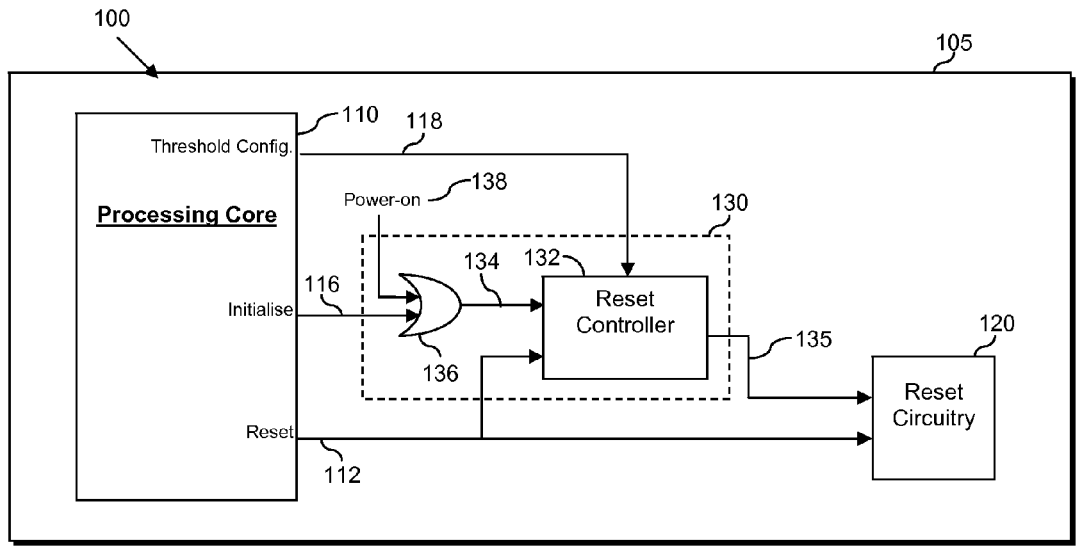
FIG. 1 illustrates a simplified block diagram of an example of a part of a digital electronic device, such as a microprocessor device.

Referring first to FIG. 1, there is illustrated a simplified block diagram of an example of a part of a digital electronic device, such as a microprocessor device 100 implemented as an integrated circuit device comprising at least one die within a single integrated circuit package 105. In the example illustrated in FIG. 1, the microprocessor device 100 comprises a minimum of a single processing core 110. In other systems not illustrated here it should be noted this processing core may comprise multiple cores, operating independently or that the processing core functionality can be spread across multiple cores. The microprocessor device 100 further comprises at least one reset module 120 comprising, for example, reset circuitry arranged to execute at least one reset sequence for the microprocessor device upon receipt of a reset signal.

In the illustrated example, reset module 120 is arranged to receive a reset signal 112 and to execute a reset sequence for components within the microprocessor device 100, such as for example a complete reset of the microprocessor device 100, upon the reset signal 112 indicating the detection of a reset event. Such a complete reset of the microprocessor device 100 may comprise substantially all components of the microprocessor device 100 being forced into a reset state, whereby such components of the microprocessor device 100 are "inaccessible" to other parts of a system (not shown) of which the microprocessor device 100 forms a part, and whereby such components of the microprocessor device 100 are unable to actively influence other parts of that system.

The microprocessor device 100 further comprises a reset management module 130. The reset management module 130 is arranged to detect a reset event, determine if at least one reset condition has been met upon detection of the reset event, and cause at least a part of the microprocessor device 100 to remain in a reset state upon determining that the at least one reset condition has been met. In particular for the example illustrated in FIG. 1, the reset management module 130 comprises a reset controller 132 arranged to receive the reset signal 112, and thereby to detect a reset event. The reset controller 132 is further arranged to output a reset hold signal 135 to be received by the reset module 120. Upon detection of a reset event, as indicated by the reset signal 112, the reset controller 132 illustrated in FIG. 1 is arranged to determine if at least one reset condition has been met, and if the reset condition(s) has/have been met, to 'set' the reset hold signal 135, indicating to the reset module 120 that one or more components within the microprocessor device 100 are to remain in a reset state following execution of a reset sequence executed for the reset event detected by the reset management module 130. In this manner, upon determining that the reset condition(s) has/have been met, the reset management module 130 is arranged to prevent the microprocessor device 100, or one or more components thereof, from exiting a reset state upon certain conditions being met. For example, the reset management module 130 may be arranged to cause the microprocessor device 100, or one or more components thereof, to remain in a reset state upon the number of detected reset events equalling a predetermined value. For example, the reset management module 130 may be arranged to cause the microprocessor device 100, or one or more components thereof, to remain in a reset state upon a single reset event being detected, or after a plurality of reset events (i.e. a number equal to the predetermined value) have been detected. In this manner, reset cycling may substantially be prevented. Accordingly, a likelihood of a situation occurring in which the error indicating event causing the reset spuriously not occurring may be significantly reduced, and as such the likelihood of the microprocessor device 100 running in an inherently unsafe state as a result of such a situation may be significantly reduced. Furthermore, by preventing the reset cycling of one or more components within the microprocessor device 100, the increase in power consumption associated with reset cycling may be substantially avoided, thereby enabling a reduction in the overall power consumption of the microprocessor device 100.

For example, upon the reset hold signal 135 being set, the reset module 120 may be arranged to configure a "stay in reset" mode of operation in which one or more components of the microprocessor device 100 are held in a reset or reset-like state substantially indefinitely. Such a mode of operation may be implemented by forcing the respective logic within the microprocessor device 100, with the exception of the logic required to keep the components of the microprocessor device 100 in this mode, into their respective reset state, and keeping them in that state substantially indefinitely via the assertion of internal reset signal(s) (not shown). Such a mode of operation may additionally/alternatively be implemented by forcing external contacts of the integrated circuit device 105 for the microprocessor device 100 to their reset state via pin control signals (not shown) so that, from outside the integrated circuit device 105, the microprocessor device 100 appears to be in reset while internally the microprocessor device 100 could be in any state.

The microprocessor device 100 may remain in such a reset mode until a power cycle of the microprocessor device 100 is performed, whereby the microprocessor device 100 is powered off and subsequently powered on again. In this manner, the reset controller 130 will be re-initialised via the power-on signal 138. Additionally/alternatively, it is contemplated that the reset module 120 may be configurable by way of, say, an externally originating signal (not shown) to release the microprocessor device 100 from reset, enabling the reset controller 130 to be re-initialised via the software configurable initialisation signal 116.

Figure 2:
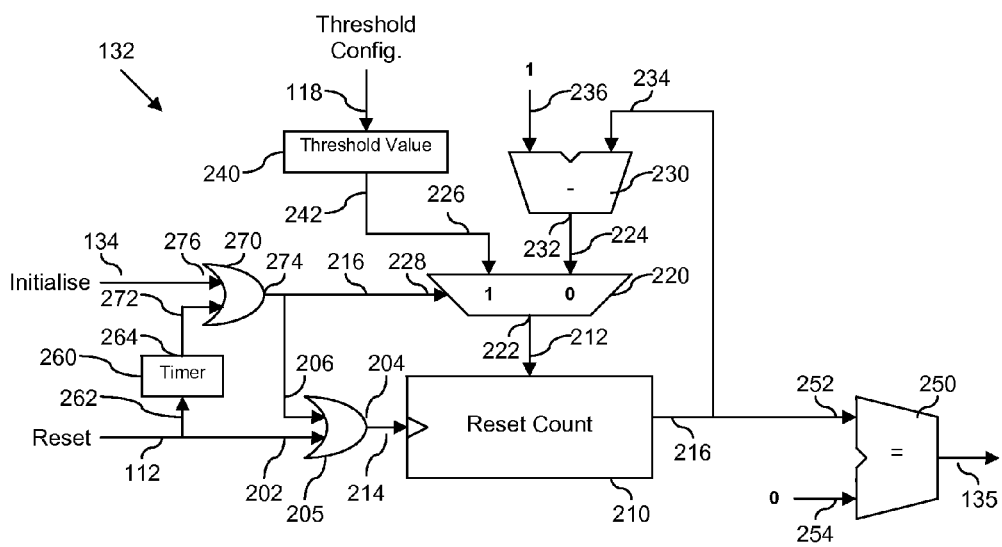
FIG. 2 illustrates a simplified block diagram of an example of a reset controller.

FIG. 2 illustrates a simplified block diagram of an example of the reset controller 132. In the example illustrated in FIG. 2, the reset controller 132 comprises a reset count element 210. The reset count element 210 is arranged to read and store a value received at a first input 212 thereof upon receipt of an active edge received at a second input 214 thereof. The reset count element 210 is further arranged to output 216 a currently stored value. The second input 214 of the reset count element 210 is arranged to receive the reset signal 112 (FIG. 1), and thus is arranged to read and store a value received at the first input 212 thereof upon an active edge of the reset signal 112; i.e. upon detection of a reset event. In the illustrated example, the second input 214 of the reset count element 210 is arranged to receive the reset signal 112 via an OR gate 205, which receives the reset signal 112 at a first input 202 thereof, and an output 204 of which is operably coupled to the second input 214 of the reset count element 210.

The first input 212 of the reset count element 210 is operably coupled to an output 222 of a multiplexer element 220. A first data input 224 of the multiplexer element 220 is operably coupled to an output 232 of a subtraction element 230. A first input 234 of the subtraction element 230 is operably coupled to the output 216 of the reset count element 210, and as such is arranged to receive the value currently stored therein. A second input 236 of the subtraction element 230 is arranged to receive, in the illustrated example, a '1' value, and the subtraction element 230 is arranged to output 232 a value equal to the value received at the first input 234 thereof minus the value received at the second input 236 thereof. As such, the subtraction element 230 in the illustrated example is arranged to output a value one less than the value stored in the reset count element 210.

A second data input 226 of the multiplexer element 220 is operably coupled to an output 242 of a programmable register 240, which in the illustrated example is arranged to configurably store a threshold value. The programmable register 240 in the illustrated example is arranged to receive a threshold configuration signal 118, for example output by the processing core 110 in FIG. 1, and is arranged to configure the threshold value stored therein in accordance with the received threshold configuration signal 118. In this manner, software running on the processing core 110 is able to configure the threshold value stored within the programmable register 240. In some alternative examples, the programmable register may be pre-configured with a 'fixed' threshold value.

The multiplexer element 220 is arranged to selectively output one of the values received at the first and second inputs 224, 226 thereof in accordance with a signal received at a control input 228 thereof. Specifically in the illustrated example, the multiplexer element 220 is arranged to output the value received at the first input 224 thereof (i.e. the decremented value output by the subtraction element 230) upon receipt of a '0' value at the control input 228 thereof, and to output the value received at the second input 226 thereof (i.e. the threshold value output by the programmable register 240) upon receipt of a '1' value at the control input 228 thereof.

The control input 228 of the multiplexer element 220 is arranged to receive an initialisation signal 216. In this manner, upon the initialisation signal 216 being set to a '1' value, the multiplexer element 220 outputs the threshold value stored within the programmable register 240. The initialisation signal 216 is also provided to a second input 206 of the OR gate 205. Accordingly, upon the initialisation signal 216 being set to a '1' value, the reset count element 210 reads and stores the threshold value output by the multiplexer element 220; thereby (re-)initialising the reset controller 132.

Conversely, when the initialisation signal 216 is set to a '0' value, the multiplexer element 220 outputs the decremented value output by the subtraction element 230. In this manner, upon an active edge of the reset signal 112; i.e. upon detection of a reset event, the reset count element 210 reads, stores and outputs the decremented value. In this manner, whilst the initialisation signal 216 comprises a '0' value, each time an active edge occurs within the reset signal 112, i.e. each time a reset event is detected, the value stored within, and output by, the reset count element 210 is decremented. The output 216 of the reset count element 210 is provided to a first input 252 of a comparator 250. A second input 254 of the comparator 250 is arranged to receive a '0' value. The comparator element 250 is arranged to output, as the reset hold signal 135, a '1' value when the signal received at the first input 252 thereof equals the signal received at the second input 254 thereof, and a '0' value otherwise. Thus, the comparator element 250 in the illustrated example outputs a '0' value whilst the value stored within and output by the reset count element 210 does not equal '0'. When the value stored within and output by the reset count element 210 equals '0', i.e. when the number of detected reset events equals the threshold value stored within the programmable register 240, the comparator element 250 outputs 135 a '1' value, indicating that one or more components within the microprocessor device 100 are to remain in a reset state following execution of a reset sequence.

Thus, the reset controller 130 in the illustrated example in effect comprises a counter arranged to decrement a value stored therein upon detection of a reset event, and to cause at least a part of the microprocessor device 100 to remain in a reset state upon a number of detected reset events equalling a threshold value. The reset controller 130 may alternatively be arranged to increment a value stored therein upon detection of a reset event, and to cause at least a part of the microprocessor device 100 to remain in a reset state upon a number of detected reset events equalling a threshold value. For example, the subtraction element 230 may be replaced with an addition element arranged increment the value stored within the reset count element 210, and the value stored within the programmable register 240 upon initialisation may be configured such that, upon the number of detected reset events equalling a desired threshold value, incrementing the value stored within the reset count element 210 causes the value stored therein to 'roll over' to '0'.

In this manner, at least a part of the microprocessor device 100 may be caused to remain in a reset state upon the number of reset events detected equalling a (configurable) threshold value. Advantageously, by enabling such functionality within hardware, as illustrated in FIG. 1, the burden of preventing reset cycling may be substantially removed from software, thereby simplifying software development etc. Additionally, since the window of opportunity for malfunction is significantly reduced by implementing the reset controller 132 within hardware, the likelihood of failure of the reset controller 132 is reduced. Furthermore, in the illustrated example a user is able to configure the threshold value based on which a reset hold signal may be set.

In the example illustrated in FIG. 2, the reset control module 132 further comprises a timer component 260. The timer 260 is arranged to receive at an input 262 thereof the reset signal 112, and to be initialised upon an active edge thereof; i.e. upon detection of a reset event. An output 264 of the timer 260 is operably coupled to the control input 228 of the multiplexer element 220 and the second input 206 of the OR gate 204. Specifically in the illustrated example, the output 264 of the timer 260 is operably coupled to a first input 272 of an OR gate 270, an output 274 of which is operably coupled to the control input 228 of the multiplexer 220 and the second input 206 of the OR gate 105. The timer 260 is arranged to output a '1' value upon expiration thereof. Thus, upon expiration of the timer 260, the reset controller 132 is re-initialised. In this manner, when reset events are detected over a long period of time, as may be the case in long run times within industrial applications, components of the microprocessor device 100 being held in a reset state as a result of long term accumulation of reset events may be avoided.

A second input 276 of the OR gate 270 is arranged to receive an external initialisation signal 134, via which the reset controller 132 may be (re-)initialised. For example, and referring back to FIG. 1, the reset management module 130 in the illustrated example comprises an OR gate 136 comprising a plurality of inputs. An output of the OR gate 136 is operably coupled to the reset controller 132 and arranged to provide the initialisation signal to the second input of the OR gate 270 within the reset controller 132. In this manner, a '1' value received at any input of the OR gate 136 will (re-)initialise the reset controller 132. In the illustrated example, the OR gate 136 is arranged to receive at one input thereof a software configurable initialisation signal 116. In this manner, software running on the processing core 110 is able to re-initialise the reset controller 132. A further input of the OR gate 136 is arranged to receive a power-on indication signal 138. In this manner, the reset controller 132 may be initialised following power-on of the microprocessor device 100.

Figure 3:
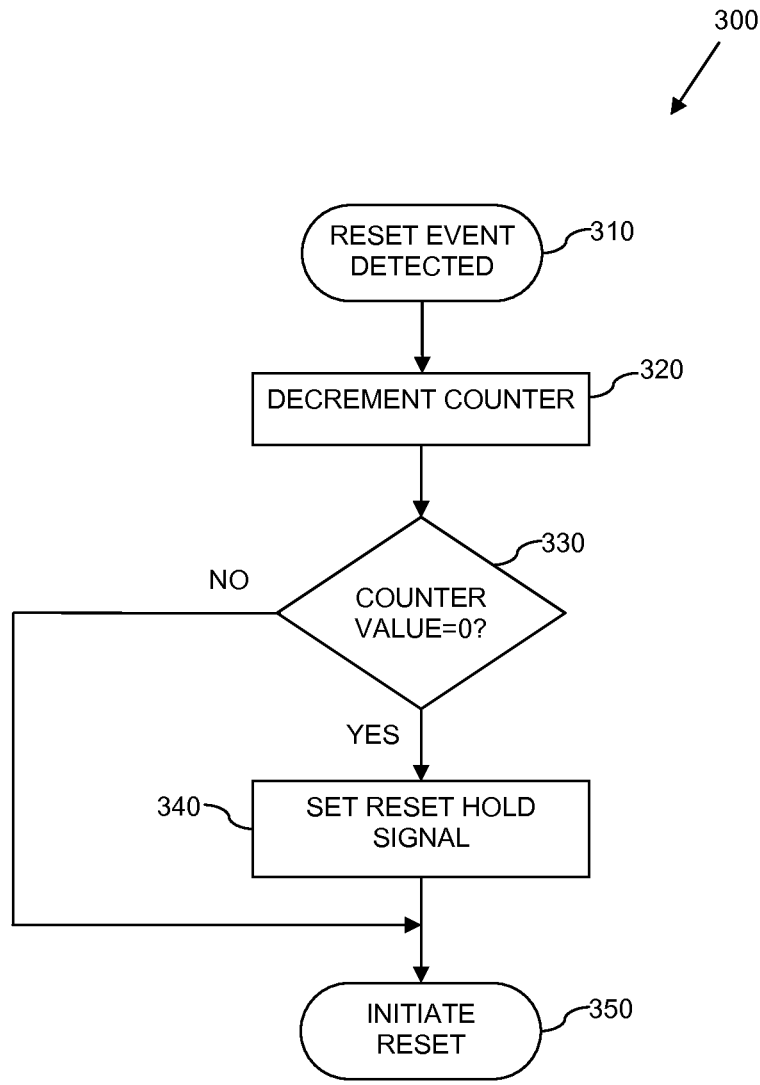
FIG. 3 illustrates a simplified flowchart of an example of a method of managing reset events.

Referring now to FIG. 3, there is illustrated a simplified flowchart 300 of an example of a method of managing reset events within a microprocessor device, such as may be implemented within the microprocessor device 100 of FIG. 1. The method starts at 310 with the detection of a reset event, and moves on to 320 where a counter is, in the illustrated example, decremented. Next, at 330, it is determined whether the counter value equals '0'. If the counter value does not equal '0', the method moves on to 350 and a reset is initiated. Conversely, if the counter value does equal '0', the method moves on to 340 where a reset hold signal is 'set', and the method moves on to 350 and a reset is then initiated.

Figure 4:
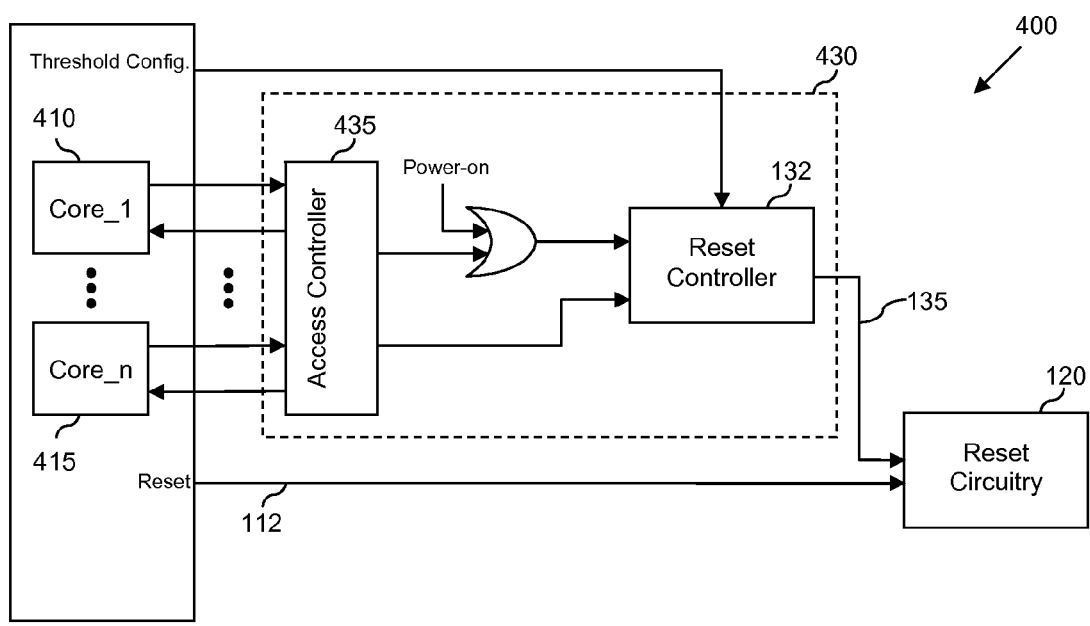
FIG. 4 illustrates a simplified block diagram of an alternative example of a part of a digital electronic device, such as a microprocessor device.

Referring now to FIG. 4, there is illustrated a simplified block diagram of another example of a part of a microprocessor device 400. In the example illustrated in FIG. 4, the microprocessor device 400 comprises multiple processing cores 410, 415. In the illustrated example, the microprocessor device 400 comprises n processing cores, where n being a positive integer of two or more such as four, eight, sixteen or another power of 2. The microprocessor device 400 comprises at least one reset module 120 comprising, for example, reset circuitry arranged to execute at least one reset sequence for the microprocessor device upon a reset signal 112 indicating the detection of a reset event.

The microprocessor device 400 further comprises a reset management module 430. The reset management module 430 is arranged to detect a reset event, determine if at least one reset condition has been met upon detection of the reset event, and cause at least a part of the microprocessor device 100 to remain in a reset state upon determining that the at least one reset condition has been met. In particular for the example illustrated in FIG. 4, the reset management module 430 comprises a reset controller 132 arranged to receive indications of a reset event (as described in greater detail below). The reset controller 132 is further arranged to output a reset hold signal 135 to be received by the reset module 120. Upon detection of a reset event, the reset controller 132 illustrated in FIG. 4 is arranged to determine if at least one reset condition has been met, and if the reset condition(s) has/have been met, to 'set' the reset hold signal 135, indicating to the reset module 120 that one or more components within the microprocessor device 100 are to remain in a reset state following execution of a reset sequence executed for the reset event detected by the reset management module 130. In this manner, upon determining that the reset condition(s) has/have been met, the reset management module 430 is arranged to prevent the microprocessor device 400, or one or more components thereof, from exiting a reset state upon certain conditions being met. For example, the reset management module 430 may be arranged to cause the microprocessor device 400, or one or more components thereof, to remain in a reset state upon the number of detected reset events equalling a predetermined value.

The reset management module 430 illustrated in FIG. 4 further comprises an access controller 435 arranged to receive requests to update the reset controller 132, and to perform arbitration of such received requests. Such requests may comprise, by way of example, requests to indicate a reset event, requests to re-initialise the reset controller 132, etc. In the illustrated example, the access controller 435 is arranged to receive requests to update the reset controller 132 from the processing cores 410, 415, and thus to perform arbitration of update requests from the plurality of processing cores 410, 415. For example, upon receipt of a request to update the reset controller 132 from a first processing core 410, the access controller 435 may be arranged to provide an indication of the received request to update the reset controller 132 to at least one further processing core 415, and to update the reset controller 132 upon receipt of confirmation of the update from the at least one further processing core 415. In some examples, the access controller 435 may be arranged to only update the reset controller 132 upon receipt of confirmation of the update from all further processing cores 415.

The indication provided to the further processing core(s) 415 may comprise a simple indication (e.g. a '1' value) that a request to update the reset controller 132 has been received, and confirmation from the further processing core(s) 415 may similarly comprise a simple response, such as a '1' value. In some examples, the access controller 435 may be arranged to only update the reset controller 132 upon receipt of confirmation of the update from the further processing core(s) 415 within a limited period of time.

A request to update the reset controller 132 received from a first processing core 410 may comprise an access key. The indication of the received request to provided by the access controller 435 to the further processing core(s) 415 may thus comprises the access key received from the first processing core 410, and the access controller 435 may be arranged to only update the reset controller 132 upon receipt of confirmation of the update from the further processing core(s) 415 comprising the respective access key.

Thus, in this manner, arbitration may be provided between requests to update reset controller (e.g. to indicate a reset event or to re-initialise the reset controller 132) received from different processing cores 410, 415 within a multi-processor architecture.

Figure 5:
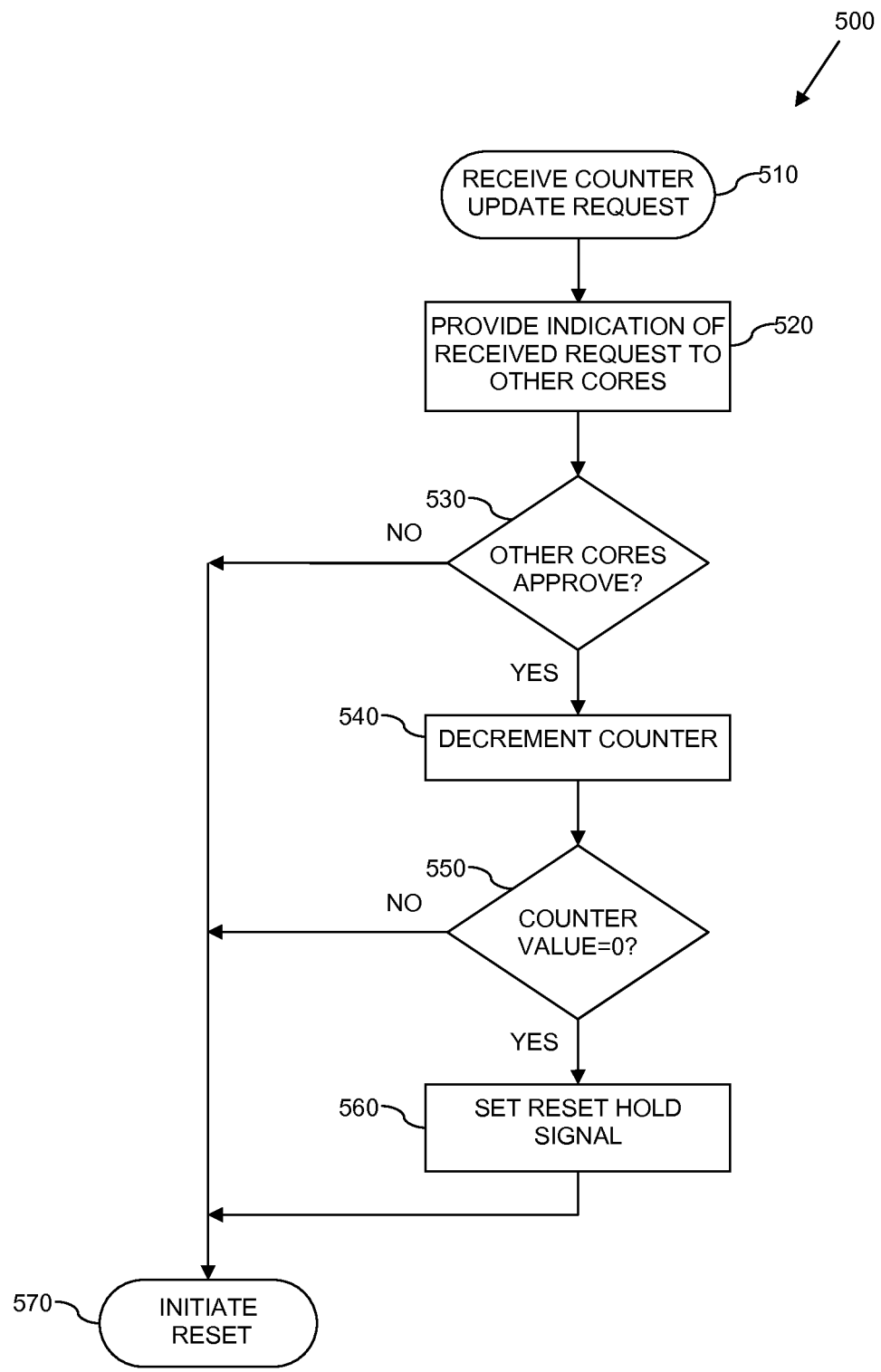
FIG. 5 illustrates a simplified flowchart of an alternative example of a method of managing reset events.

Referring now to FIG. 5, there is illustrated a simplified flowchart 500 of an example of a method of managing reset events within a microprocessor device, such as may be implemented within the reset management module 430 of FIG. 4. The method starts at 510 with the receipt of a request to update a reset counter, such as the reset counter implemented within the reset controller 132, from a first processing core, such as processing core 410 in FIG. 4. Such a request may simply be in a form of an indication of a reset event. The method then moves on to 520, where an indication of the received request to update the reset counter is provided to other processing cores within the microprocessor device, such as to processing core 415. Next, at 530, if approval is not received from, say, all, or a minimum number of, other processing cores, or disapproval is received from, say, one or more other processing cores, the method moves on to 570 and a reset is initiated without further actions being taken. Conversely, if approval is received from, say, all, or a minimum number of, other processing cores, or no disapproval is received from any other processing core, the method moves on to 540 where the counter is decremented, in the illustrated example. The approval from the processing cores may occur prior to the actual counter update request as, for example, part of the device configuration process. Next, at 550, it is determined whether the counter value equals '0'. If the counter value does not equal '0', the method moves on to 570 and a reset is initiated without further actions being taken. Conversely, if the counter value does equal '0', the method moves on to 560 where a reset hold signal, such as the reset hold signal 135 illustrated in FIG. 4, is 'set' and the method moves on to 570 and a reset is then initiated.

Thus, a method and apparatus for managing reset events have been described. In particular, a method and apparatus of configurably and flexibly enabling the management of reset events have been described in which a digital electronic device, such as a microprocessor device, or one or more components thereof, may be prevented from exiting a reset state upon determining that one or more reset condition(s) has/have been met. For example, the microprocessor device, or one or more components thereof, may be prevented from exiting a reset state upon the number of detected reset events equalling a configurable, predetermined value. In this manner, reset cycling may substantially be prevented. Accordingly, a likelihood of a situation occurring in which the error indicating event causing the reset spuriously not occurring may be significantly reduced, and as such the likelihood of the microprocessor device running in an inherently unsafe state as a result of such a situation may be significantly reduced.

In the foregoing specification, the invention has been described with reference to specific examples of embodiments of the invention. It will, however, be evident that various modifications and changes may be made therein without departing from the broader scope of the invention as set forth in the appended claims and that the claims are not limited to the specific examples shown herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, in the illustrated examples the reset management module 130, 430 and the reset module 120 have been illustrated as separate logical blocks. However, it will be appreciated that the at least one reset management module 130, 430 and the reset module 120 may have one or more common components, and/or may comprise a single functional component.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A microprocessor comprising:
a reset management module arranged to:
 detect a first reset event of the microprocessor;
 determine a first number of reset events, including the first reset event, that have been detected;
 determine if a reset condition has been met based on whether the first number of reset events meets a threshold value, upon detection of the reset event;
 reset a first part of the microprocessor in response to the reset condition not being met;
 detect a second reset event of the microprocessor;
 determine a second number of reset events, including the first and second reset events that have been detected; and determine if the reset condition has been met based on whether the second number meets a threshold value;
 reset the first part of the microprocessor and a second part of the microprocessor upon determining that the reset condition has been met.

2. The microprocessor of claim 1, wherein the reset management module comprises at least one reset controller comprising a counter, and the at least one reset controller is arranged to:
 increment/decrement a value of the at least one counter upon detection of a reset event.

3. The microprocessor of claim 2, wherein the threshold value is configurable.

4. The microprocessor of claim 2, wherein the at least one reset controller comprises at least one timer, and the at least one reset controller is arranged to:
  initialise the at least one timer upon detection of a reset event; and
  re-initialise the at least one counter upon expiry of the at least one timer.

5. The microprocessor of claim 2, wherein the reset management module is arranged to re-initialise the at least one counter upon at least one from a group comprising at least one of:
  receiving a software generated re-initialise signal; and
  powering up of the microprocessor.

6. The microprocessor of claim 2, wherein the microprocessor comprises multiple processing cores and the reset management module comprises an access controller arranged to:
  receive requests to update the at least one counter of the reset management module; and
  perform arbitration of received requests to update the at least one counter.

7. The microprocessor of claim 6, wherein the access controller is arranged to, upon receipt of a request to update the at least one counter from a first processing core:
  provide an indication of the received request to update the at least one counter to at least one further processing core; and
  to update the at least one counter upon receipt of confirmation of the update from the at least one further processing core.

8. The microprocessor of claim 7, wherein the request to update the at least one counter received from the first processing core comprises an access key.

9. The microprocessor of claim 8, wherein the indication of the received request to update the at least one counter provided by the access controller to the at least one further processing core comprises the access key received from the first processing core.

10. The microprocessor of claim 7, wherein the access controller is arranged to update the at least one counter upon receipt of confirmation of the update from each of the further processing cores.

11. The microprocessor of claim 1, wherein the reset management module is arranged to:
  detect a destructive reset event;
  determine if a second reset condition has been met upon detection of the destructive reset event; and
  cause at least a part of the microprocessor to remain in a reset state upon determining that the second reset condition has been met.

12. The microprocessor of claim 1, wherein the reset management module is arranged to output a reset hold signal upon determining that the reset condition has been met.

13. The microprocessor of claim 12 wherein the microprocessor further comprises at least one reset module arranged to receive the reset hold signal output by the reset management module, and to hold the second part of the microprocessor in a reset state upon receipt of the reset hold signal.

14. The microprocessor of claim 1 implemented as an integrated circuit device comprising at least one die within a single integrated circuit package.

15. A method of managing reset events of a microprocessor, the method comprising:
  detecting a first reset event;
  determining a first number of reset events, including the first reset event, that have been detected;
  determining if a reset condition has been met based on whether the first number of reset events meets a threshold value;
  resetting a first part of the microprocessor in response to the reset condition not being met;
  detecting a second reset event of the microprocessor;
  determining a second number of reset events, including the first and second reset events, that have been detected;
  determining if the reset condition has been met based on whether the second number meets a threshold value; and
  resetting the first part of the microprocessor and a second part of the microprocessor upon determining that the reset condition has been met.

16. The method of claim 15, further comprising:
  incrementing or decrementing, by a reset controller, a value of a counter upon detection of the first reset event;
  receiving, by an access controller of the reset management module, requests to update the at least one counter of the reset management module; and
  performing, by the access controller, arbitration of received requests to update the at least one counter.

17. The method of claim 15, further comprising:
  detecting a destructive reset event;
  determining if a second reset condition has been met upon detection of the destructive reset event; and
  causing at least a part of the microprocessor to remain in a reset state upon determining that the second reset condition has been met.

18. A method of managing reset events of a microprocessor, the method comprising:
  detecting a first reset event, wherein the first reset event causes a complete reset of at least a portion of the microprocessor;
  determining a first number of reset events, including the first reset event, that have been detected;
  determining if a reset condition has been met based on whether the first number of reset events meets a threshold value;
  resetting a first part and a second part of the microprocessor in response to the reset condition not being met;
  detecting a second reset event of the microprocessor;
  determining a second number of reset events, including the first and second reset events, that have been detected;
  determining if the reset condition has been met based on whether the second number meets a threshold value;
  resetting the first part of the microprocessor and a second part of the microprocessor upon determining that the reset condition has been met.

19. The method of claim 18, further comprising:
  performing, by an access controller of a reset management module, arbitration of received requests to update a counter of the reset management module.

20. The method of claim 18, further comprising:
  detecting a destructive reset event;
  determining if a second reset condition has been met upon detection of the destructive reset event; and
  cause the microprocessor to remain in a reset state upon determining that the second reset condition has been met.

* * * * *